Dec. 31, 1968  G. A. DOTTO  3,419,740
SELF-COMMUTATED DIRECT CURRENT MOTOR WITH
PERMANENT MAGNET ROTOR
Filed June 6, 1966
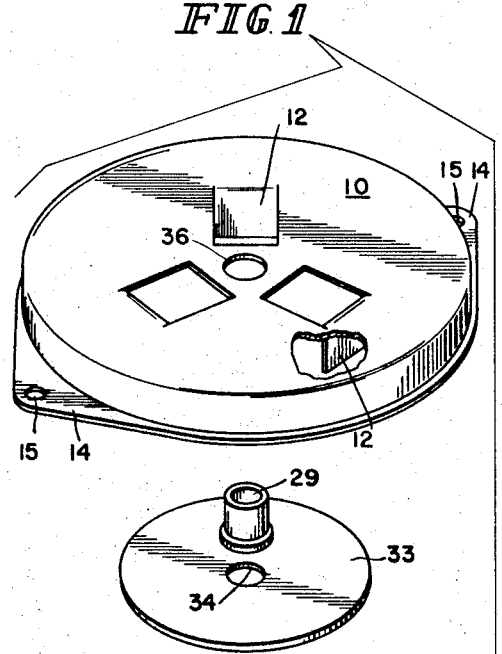
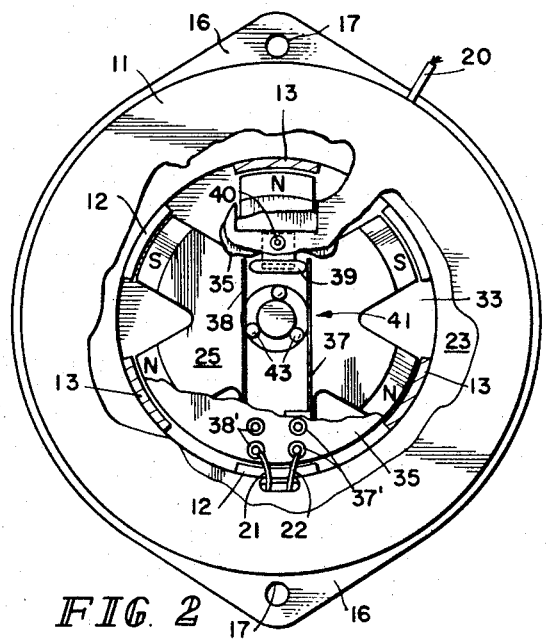
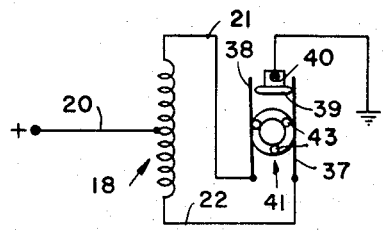
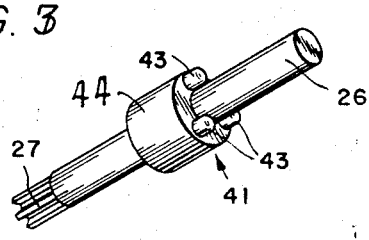
INVENTOR
GIANNI A. DOTTO
BY
Robert Greene
ATTORNEY

United States Patent Office 3,419,740
Patented Dec. 31, 1968

3,419,740
SELF-COMMUTATED DIRECT CURRENT MOTOR WITH PERMANENT MAGNET ROTOR
Gianni A. Dotto, Dayton, Ohio, assignor to P. R. Mallory & Co. Inc., Indianapolis, Ind., a corporation of Delaware
Filed June 6, 1966, Ser. No. 555,324
12 Claims. (Cl. 310—46)

The present invention relates to motors and more particularly to the means and methods for providing a direct current motor having a permanent magnet rotor. The motor of the present invention is further characterized by a self-contained commutator means for alternately changing the direction of current flow through the field coil means, thereby changing the polarity of the stator poles. The stator poles of the motor of the present invention may be integrally formed out of a soft magnetic metal housing so as to provide a compact motor which is easy to manufacture. In addition, the motor of the present invention provides relatively high output torques at relatively high speeds and is more compact than direct current motors providing similar torques at similar speeds.

The motor of the present invention may be widely used in applications where a direct current power source is available. For instance, the motor of the present invention may be used in automotive applications to drive windshield wipers, window opening mechanisms, etc.

The motor of the present invention has fewer parts than contemporary motors capable of providing the same output torques at the same speed. For instance, in one embodiment of the present invention, the stator poles are integrally formed out of the soft magnetic metal housing. A simple spool wound field coil is annularly disposed about the integrally formed stator poles. The field coil may be a bifilar wound coil interconnected so as to provide a pair of opposing coils. The aforementioned commutator means is a means for alternately energizing the opposing coils so as to change the polarity of the stator poles. In a simple embodiment, the commutator means includes a pair of brushes, each brush being connected to one of the opposing coils, and a rotating means for alternately connecting the brushes to one side of a direct current power source. Both of the opposing coils are also connected to an opposite side of the direct current power source.

It is an object of the present invention therefore, to provide a new and improved direct current motor.

It is an other object of the present invention to provide a direct current motor for producing relatively high output torques at relatively high speeds which is more compact than direct current motors for providing similar torques at similar speeds.

It is a further object of the present invention to provide a direct current motor which has a minimum number of parts and which is easy to manufacture.

It is yet another object of the present invention to provide a direct current motor contained in a soft magnetic metal housing having stator poles integrally formed out of said housing.

It is still a further object of the present invention to provide a direct current motor having a permanent magnet rotor with a plurality of alternately spaced north and south poles about the periphery thereof and a plurality of stator poles radially and evenly spaced about the rotor.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in connection with the accompanying figures of the drawing, and wherein like reference characters describe elements of similar function therein and wherein the scope of the invention is determined from the appended claims.

For illustrative purposes the invention will be described in connection with the accompanying drawing in which:

FIGURE 1 is an exploded perspective view of the motor of the present invention.

FIGURE 2 is a bottom view of the motor of the present invention with the bottom cover partially broken away to show cooperation between the rotor, commutator means and field coil.

FIGURE 3 is a schematic diagram illustrating the operation of the commutator means and field coil.

FIGURE 4 is a perspective view of the rotating element of the commutator means.

Generally speaking, the present invention is a direct current motor having a rotor with a plurality of radially and evenly spaced permanent magnet poles. The rotor is fixedly mounted on a shaft rotatably supported on said motor. A plurality of stator poles are radially and evenly spaced about the rotor so as to provide a uniform air gap therebetween and a field coil means is provided for determining the polarity of the stator poles. The field coil is disposed about the stator poles. There is a commutator means for alternately changing the direction of current flow through the field coil means to thereby change the polarity of the stator poles. The commutator means is comprised of first and second brushes and a rotating means for alternately contacting the first and second brushes to a negative side of a direct current power source. The rotating means is fixedly mounted on the rotor shaft. There are means for connecting the first and second brushes to the field coil means and means for connecting the field coil means to a positive side of the direct current power source.

Referring now to the drawing, and particularly to the exploded perspective of FIGURE 1, the component parts of the present invention can be visualized in conjunction with the following description.

The substantially cylindrically shaped housing for the motor of the present invention is composed of a top cover 10 and bottom cover 11 which are fabricated of soft magnetic metal. There are stator poles 12 struck out of the top cover 10 and stator poles 13 struck out of the bottom cover 11. The stator poles 12 and 13 are struck out of the substantially flat ends of the top cover 10 and bottom cover 11. The stator poles 12 and 13 are radially and evenly disposed so as to form an intermeshing circle when the top cover 10 and bottom cover 11 are held together.

There are a pair of mounting ears 14 with mounting holes 15 provided on the top cover 10 and a pair of mounting ears 16 with mounting holes 17 provided on the bottom cover 11.

When the top cover 10 and bottom cover 11 are held together, the stator poles 12 intermesh with the stator poles 13. Therefore, there is a space between the stator poles 12 and 13 and the outside walls of the top cover 10 and bottom cover 11 and a circular space inside the stator poles 12 and 13. A field coil 18 is annularly disposed in the space between the stator poles 12 and 13 and the outside walls of the housing and a rotor 19 is concentrically disposed inside the stator poles 12 and 13.

In the illustrative embodiment of FIGURE 1, the field coil 18 is a bifilar wound, center tapped coil. There is a center tap lead 20 and a pair of end tap leads 21 and 22 connected to the coil. The bifilar wound coil of insulated wire is wound on an insulated spool 23 and an insulated tape 24 is wrapped around the wire. The center tap lead 20 and two end tap leads 21 and 22 are connected so as to provide a north magnetic pole in one direction when current flows from the center tap lead 20 to the end tap lead 21 and a north magnetic pole in the opposite direction when current flows from the center tap lead to the end tap lead 22.

The rotor 19 illustrated in FIGURE 1 is composed of a permanent magnet member 25 fixedly mounted on a shaft 26 having an integrally formed pinion gear 27 thereon. The permanent magnet member 25 has a plurality of radially and evenly spaced permanently magnetized appendages 28. The appendages 28 are alternately magnetized north and south. In the illustrative embodiment of FIGURE 1, there are six appendages 28 and six stator poles 12 and 13.

The rotor 19 shaft 26 is rotatably supported in a pair of bearings 29 and 30. The bearing 29 is mounted in a centrally located hole 31 in the top cover 10 and the bearing 30 is mounted in a centrally located hole 32 in the bottom cover 11.

There is a circularly shaped member 33 concentrically disposed between the top cover 10 and the rotor 19 so as to cover the openings left by forming the stator poles 12 out of the top cover 10. The member 33 may be any suitable material but will usually be an insulator. The shaft 26 extends through a centrally located hole 34 in the member 33.

A circularly shaped insulative member 35 is concentrically disposed between the rotor 19 and the bottom cover 11 so as to cover the openings left by forming the stator poles 13 out of the bottom cover 11. The shaft 26 extends through an opening 36 in the member 35.

A pair of brushes 37 and 38 are fastened to the member 35 by a pair of rivets 37' and 38' which are adapted to engage four holes 37" and 38" in the member 35. The end tap lead wire 21 is connected to the brush 38 and the end tap lead wire 22 is connected to the brush 37.

There is a common terminal or contact 39 disposed between the brushes 37 and 38 and a rivet 40 for fastening the common terminal or contact 39 to the member 35 and the bottom cover 11. The rivet 40 electrically connects the common terminal or contact 39 to the bottom cover 11. The rivet 40 is swaged in a hole 42 in the bottom cover 11.

A rotating means 41, hereinafter referred to as the rotating commutator element 41, is mounted on the shaft 26 and is adapted to alternately contact the brushes 37 and 38 to the common terminal or contact 39, and, consequently, to the bottom cover 11. The rotating commutator element 41, which is not shown in FIGURE 1, will be discussed in conjunction with FIGURES 2, 3 and 4.

Referring now to FIGURE 2, it can be seen that the rotating commutator element 41 has three radially and equally spaced actuators 43 disposed thereon. As the rotating commutator element 41 rotates, the actuators 43 alternately displace the brushes 37 and 38 out of contact with the common terminal 39.

Referring now to FIGURE 3, it can be seen that when the brush 38 is in contact with the terminal 39, current can flow through a first side of the field coil 18 to ground and when the brush 37 is in contact with the terminal 39, current can flow through a second side of the field coil 18 to ground.

Therefore, when a positive direct current voltage is applied to the center tap lead 20 and the brushes 37 and 38 are alternately displaced from the terminal 39 by the rotating commutator element 41, the magnetic field induced by the field coil 18 will alternately change directions. Since the magnetic field induced by the spool wound field coil 18 is in the direction of the shaft 26, the top cover 10 and bottom cover 11 are alternately magnetized north and south as the rotor 19 rotates.

Referring again to FIGURE 2, it can be seen that when there is a north magnetic pole in the direction of the bottom cover 11, the stator poles 13 will be north poles and the stator poles 12 will be south poles. Therefore, the stator poles 13 will repulse the permanently magnetized north poles on the rotor 19 and the stator poles 12 will repulse the permanently magnetized south poles on the rotor 19. When the rotor has turned so that there is a north magnetic pole in the direction of the top cover 10, the stator poles 13 will be south poles and the stator poles 12 will be north poles.

Referring now to FIGURE 4, a perspective view of a typical rotating commutator element 41 can be discussed. The illustrated rotating commutator element 41 is an insulative sleeve 44 pressed fitted on the shaft 26. The sleeve 44 has three equally and radially spaced actuators 43 attached thereto as shown. The operation of the actuators 43 is illustrated clearly in FIGURES 2 and 3.

The bifilar wound field coil 18 is an ideal means for defining a magnetic axis which is concentric with the shaft 26 and uniform in strength regardless of the polarity of the field coil 18. A single field coil could be adapted to accomplish the same result by alternately switching both ends of the coil, one end to ground and the other end to the positive voltage source.

Although the drawing shows the center tap of the field coil 18 connected to a positive voltage source and the two end taps alternately connected to ground, the end taps can be alternately connected to a positive voltage source and the center tap could be connected to ground. The direction of rotation of the motor can, therefore, be changed by changing the polarity of the voltage applied to the center tap. The use of a positive voltage source and ground connection is, therefore, merely illustrative and follows the conventions usually used in automotive practice.

A motor has been constructed in accordance with the present invention. The constructed motor is approximately 2½" in diameter and ⅝" thick. The field coil of the constructed motor has two bifilar wound coils each containing 620 turns of #32 AWG insulated wire. When tested, the constructed motor provided 18-20 in.-oz. of output torque at approximately 2400 r.p.m. with a 12 volt direct current input.

The motor of the present invention, as hereinbefore described in one of its embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. A direct current motor comprising: a permanent magnet rotor having a plurality of radially and evenly spaced magnetic poles, said rotor being fixedly mounted on a shaft rotatably supported in said motor; a plurality of stator poles radially and evenly spaced about said rotor so as to provide a uniform air gap therebetween; field coil means for determining the polarity of said stator poles, said field coil means being disposed about said stator poles; commutator means for alternately changing the direction of current flow through said field coil means to thereby change the polarity of said stator poles, said commutator means comprising first and second brushes, a common contact for said first and second brushes, and a rotating commutator element for alternately contacting said first and second brushes to said common contact, said rotating commutator element being fixedly mounted on said shaft, said common contact being connected to a negative side of a direct current power source; means for connecting said first and second brushes to said field coil means; and means for connecting said field coil means to a positive side of said direct current power source.

2. A direct current motor as in claim 1 wherein said common contact is connected to a positive side of said direct current power source and said field coil means is connected directly to a negative side of said direct current power source.

3. A direct current motor as in claim 1 wherein said field coil means is a bifilar wound coil having a center tap and a pair of end taps, said center tap being connected directly to a positive side of said direct current power source, a first of said end taps being connected to said first brush and a second of said end taps being connected to said second brush.

4. A direct current motor as in claim 3 wherein said bifilar wound coil is annularly disposed about said stator poles so to have a magnetic axis in the direction of said shaft.

5. A direct current motor as in claim 1 wherein there is a substantially cylindrically shaped soft magnetic metal housing having a pair of substantially flat ends and said stator poles are integrally formed out of said ends.

6. A direct current motor as in claim 5 wherein there are six magnetic poles on said rotor and six stator poles formed out of said housing, three of said radially and equally spaced stator poles being formed out of a first of said substantially flat ends and three of said radially and equally spaced stator poles being formed out of a second of said substantially flat ends.

7. A direct current motor as in claim 5 wherein said field coil means is annularly disposed in the space between said stator poles and the outside walls of said housing.

8. A direct current motor as in claim 1 wherein there are three pairs of permanent magnet rotor poles and three pairs of stator poles.

9. A direct current motor comprising: a substantially cylindrically shaped soft magnetic metal housing having substantially flat ends; a plurality of equally and radially spaced stator poles formed out of said substantially flat ends so as to form an intermeshing circle of stator poles; a rotor having a plurality of radially and evenly spaced permanent magnet poles about the periphery thereof, said rotor being concentrically disposed in said circle of stator poles and mounted on a shaft rotatably supported in said ends of said housing; field coil means for determining the polarity of said stator poles, said field coil means having a center tap and a pair of end taps, said field coil means annularly disposed in the space between said stator poles and the outside walls of said housing; commutator means for alternately changing the direction of current flow through said field coil means, said commutator means comprising first and second brushes, a common contact for said first and second brushes, and a rotating commutator element for alternately contacting said first and second brushes to said common contact, said rotating commutator element being fixedly mounted on said shaft, said common contact being connected to a negative side of a direct current power source, said first brush being connected to a first of said end taps and said second brush being connected to a second of said end taps; and means for connecting said center tap to a positive side of said direct current power source.

10. A direct current motor as in claim 9 wherein said field coil means is a bifilar wound coil having a center tap and a pair of end taps.

11. A direct current motor as in claim 9 wherein said common contact is connected to a positive side of a direct current power source and said center tap is connected to a negative side of said direct current power source.

12. A motor comprising: a rotor having a plurality of radially and evenly spaced permanent magnet poles, said rotor being fixedly mounted on a shaft rotatably supported on said motor; a plurality of stator poles radially and evenly spaced about said rotor so as to provide a uniform air gap therebetween; field coil means for determining the polarity of said stator poles, said field coil means being disposed about said stator poles; commutator means for alternately changing the direction of current flow through said field coil means to thereby change the polarity of said stator poles, said commutator means comprising first and second brushes and a rotating means for alternately contacting said first and second brushes to a negative side of a direct current power source, said rotating means being fixedly mounted on said shaft; means for connecting said first and second brushes to said field coil means; and means for connecting said field coil means to a positive side of said direct current power source.

References Cited

UNITED STATES PATENTS

| | | | |
|---|---|---|---|
| 2,457,637 | 12/1948 | Brailsford | 310—46 |
| 2,595,870 | 5/1952 | Morganson | 310—46 |
| 2,989,653 | 6/1961 | Wengel | 310—46 |
| 3,014,141 | 12/1961 | Riggs | 310—156 |

WARREN E. RAY, *Primary Examiner.*

U.S. Cl. X.R.

310—156, 177, 233